US008659198B2

(12) United States Patent
Inoue

(10) Patent No.: US 8,659,198 B2
(45) Date of Patent: Feb. 25, 2014

(54) ACTUATOR

(75) Inventor: Hiroto Inoue, Toyohashi (JP)

(73) Assignee: ASMO, Co. Ltd., Kosai-shi, Shizuoka-ken (JP)

( * ) Notice: Subject to any disclaimer, the term of this patent is extended or adjusted under 35 U.S.C. 154(b) by 299 days.

(21) Appl. No.: 13/277,455

(22) Filed: Oct. 20, 2011

(65) Prior Publication Data

US 2012/0098364 A1  Apr. 26, 2012

(30) Foreign Application Priority Data

Oct. 22, 2010 (JP) ................................. 2010-237779

(51) Int. Cl.
*H02K 11/00* (2006.01)

(52) U.S. Cl.
USPC .......................................... 310/71; 310/75 R

(58) Field of Classification Search
USPC ......................................... 310/71, 68 B, 75 R
See application file for complete search history.

(56) References Cited

U.S. PATENT DOCUMENTS

| | | | | |
|---|---|---|---|---|
| 5,777,410 A | * | 7/1998 | Asakura et al. | 310/71 |
| 6,294,851 B1 | * | 9/2001 | Matsuyama et al. | 310/43 |
| 7,402,926 B2 | * | 7/2008 | Shinmura et al. | 310/83 |
| 7,474,024 B2 | * | 1/2009 | Nakanishi | 310/71 |
| 2011/0291501 A1 | * | 12/2011 | Watanabe et al. | 310/71 |

FOREIGN PATENT DOCUMENTS

JP  2004-166320  10/2004

* cited by examiner

*Primary Examiner* — Nguyen N Hanh
(74) *Attorney, Agent, or Firm* — Marsh Fischmann & Breyfogle LLP

(57) ABSTRACT

An actuator including a motor, case, resin mold, connector terminal, and two power supplying terminals. The motor includes two power receiving terminals. The resin mold is arranged in the case at a location close to one end. Each power supplying terminals includes a first extension, which is formed in a distal portion and includes a bent portion, and a second extension, which extends upward or downward from the bent portion. Each second extension includes a contact portion that elastically contacts the corresponding power receiving terminal in a direction in which an axis extends. The contact portions are located at positions that differ between the two power supplying terminals in a vertical direction. In the two power supplying terminals, the bent portions are located at different positions in the vertical direction. Further, the first extensions have different lengths from the resin mold.

6 Claims, 4 Drawing Sheets

ACTUATOR

BACKGROUND OF THE INVENTION

The present invention relates to an actuator for activating an air current passage switching door in, for example, a vehicle air conditioner.

Japanese Laid-Open Patent Publication No. 2004-166320 describes an example of an actuator including a motor, which serves as a drive source. The motor is arranged in a case so that the axis of the motor extends perpendicular to a vertical direction of the case. Two power supplying terminals are arranged on a first end and an opposite second end of the motor from which an output shaft extends. The two power supplying terminals, which respectively contact the two power receiving terminals, are embedded in a resin mold arranged in the vicinity of the second end. The power supplying terminals are connected to a connector terminal, which is further connected to an outer terminal. This supplies the motor with power from the outer connector. Further, a portion projecting from the resin mold in each power supplying terminal is generally L-shaped and includes a first extension, which extends from the resin mold toward the motor, and a second extension, which extends upward from a bent distal end of the first extension and includes a contact portion that contacts the power receiving terminal. The contact portion elastically contacts the power receiving terminal in an axial direction of the motor. This stabilizes the application of voltage to the power receiving terminal.

In the above actuator, the contact portions of the two power supplying terminals are required to be located at different positions in the vertical direction in accordance with the structures of the power receiving terminals. When the contact portions are located at different positions in the vertical direction, the power supplying terminals may be formed so that the bent portions (lower end of each second extension) are located at the same position in the vertical direction but the lengths differ from the bent portions to the contact portions. Alternatively, as described in the above publication, the power supplying terminals may be formed so that the lengths are the same from the bent portions to the contact portions but the bent portions (lower end of each second extension) are located at different positions in the vertical direction. However, when the lengths differ from the bent portions to the contact portions, the elastic force applied to the motor differs between the two power supplying terminals. This may adversely affect the rigidity of the motor. Further, when the bent portions are located at different positions in the vertical direction, the two power supplying terminals must be formed from different plates. This lowers the yield of the power supplying terminals.

SUMMARY OF THE INVENTION

It is an object of the present invention to provide an actuator that applies the same elastic force to the motor with two power supplying terminals while allowing the two power supplying terminals to be formed from the same plate thereby improving yield.

One aspect of the present invention is an actuator provided with a motor including a first end, an opposite second end, and two power receiving terminals arranged on the second end. An output shaft projects from the first end. A case accommodates the motor so that an axis of the motor extends perpendicular to a vertical direction of the case. A resin mold is arranged in the case at a location close to the second end. Two connector terminals are connectable to an external connector. Two power supplying terminals are electrically connected to the two connector terminals, respectively. Each of the power supplying terminals is partially embedded in the resin mold and includes a first extension and a second extension. The first extension extends from the resin mold toward the motor and includes a distal portion defining a bent portion. The second extension extends upward or downward from the bent portion and includes a contact portion that elastically contacts a corresponding one of the power receiving terminals in a direction in which the axis extends. The contact portion of one of the two power supplying terminals is located at a position in the vertical direction that differs from the contact portion of the other one of the two power supplying terminals. The bent portions in the two power supplying terminals are arranged at the same position in the vertical direction, and the first extensions are extended by different extension lengths from the resin mold.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
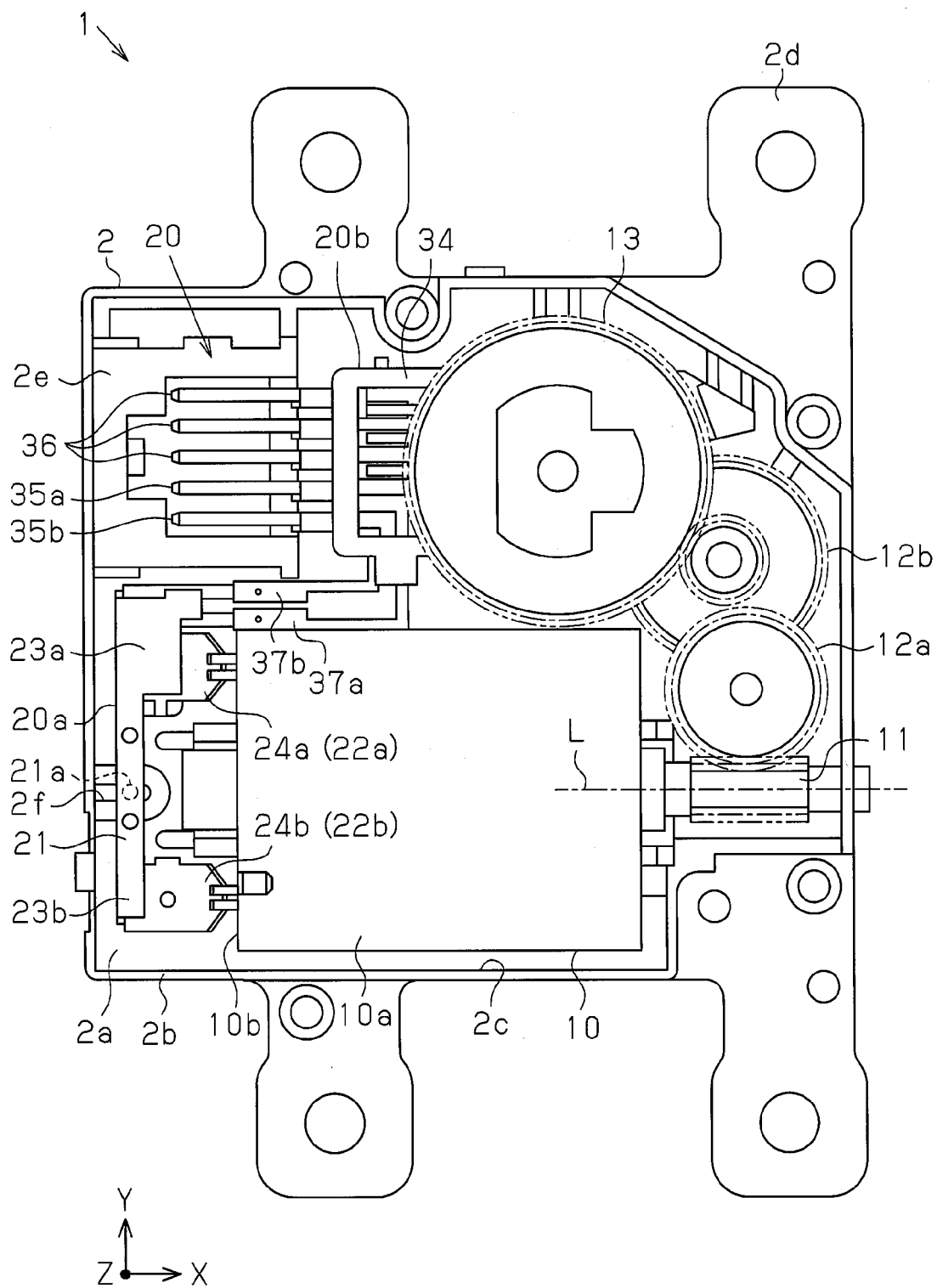
FIG. 1 is a schematic diagram showing an actuator according to one embodiment of the present invention.

FIG. 1 shows an actuator 1 of the present embodiment. The actuator 1 is used in a vehicle air conditioner to provide power for opening and closing an air current passage switching door, such as an air intake switching door, a temperature adjustment door, and an outlet switching door.

The actuator 1 includes a case formed by a case body 2 and a cover (not shown). The case body 2 includes a plate-shaped bottom wall 2a and side walls 2b, which extend from the periphery of the bottom wall 2a in a direction perpendicular to the bottom wall 2a (vertical direction Z).

The cover (not shown) covers an opening that is formed by the side walls 2b to accommodate internal components in the case body 2. FIG. 1 shows a state in which the cover is removed from the actuator 1. A plurality of (four in the present embodiment) fastening portions 2d extending outward from the side walls 2b are fastened by screws (not shown) to predetermined fastening positions.

A motor 10, which serves as a drive source, is accommodated in the case body 2. The motor 10 is arranged so that its axis L extends perpendicular to the vertical direction Z of the case body 2. A worm gear 11 is fixed to an output shaft (not shown) of the motor 10 and supported by one of the side walls 2b of the case body 2. The worm gear 11 rotates integrally with the output shaft of the motor 10. A first intermediate gear 12a and a second intermediate gear 12b decrease the speed of rotation of the worm gear 11 and transmit the rotation to an output gear 13. Each of the first intermediate gear 12a, second intermediate gear 12b, and output gear 13 are supported in a rotatable manner by the case body 2.

Figure 5:
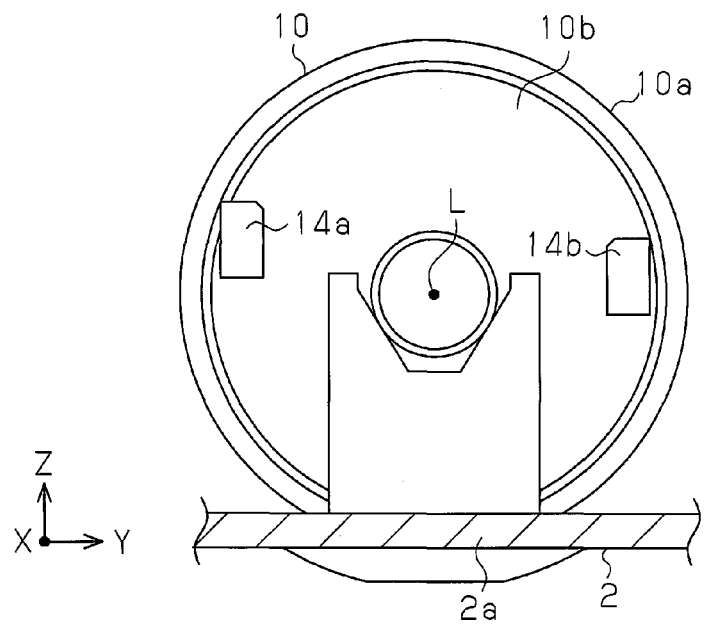
FIG. 5 is a side view showing a motor of FIG. 1 from taken from a side opposite to the end of the motor from which an output shaft projects.

The motor 10 includes a housing 10a with a first end, from which the output shaft projects, and an opposite second end 10b. As shown in FIG. 5, the second end 10b includes first and second power receiving terminals 14a and 14b, which supply power to the motor 10. Each of the power receiving terminals 14a and 14b has the form of a thin plate that lies along a plane perpendicular to the axis L of the motor 10. Thus, the power receiving terminals 14a and 14b has surfaces located at the same position relative to the direction in which the axis L extends, which is referred to as a widthwise direction X. The second power receiving terminal 14b is arranged at a position that is lower than the first power receiving terminal 14a in the vertical direction Z. Thus, the second power receiving terminal 14b is closer to the bottom wall 2a than the first power receiving terminal 14a.

Figure 2:
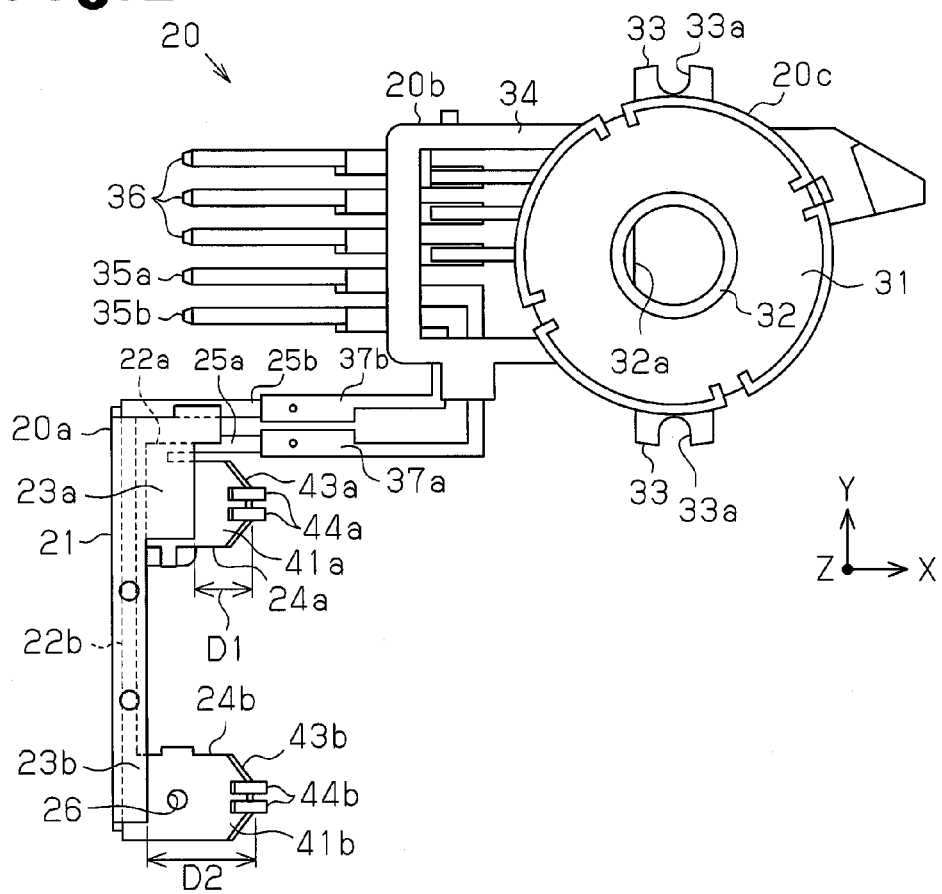
FIG. 2 is a plan view showing a connector assembly of FIG. 1.
Figure 3:
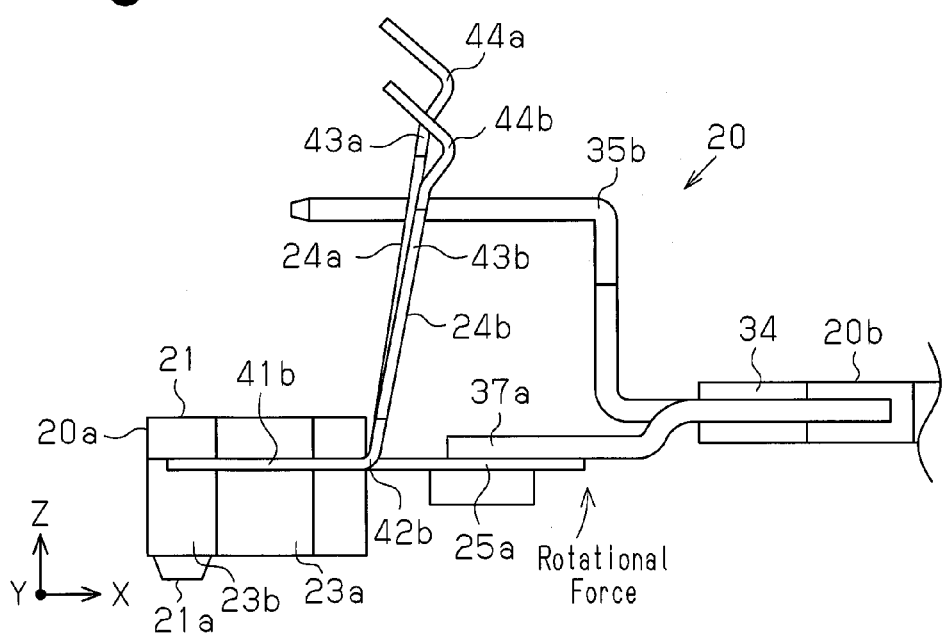
FIG. 3 is a side view showing the connector assembly of FIG. 1 taken along a forward direction Y.
Figure 4:
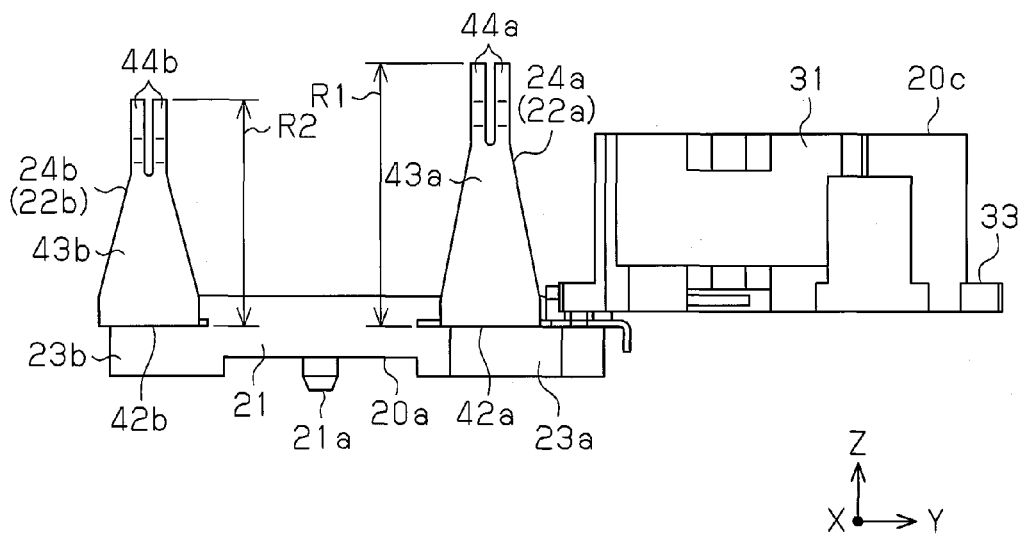
FIG. 4 is a side view showing the connector assembly of FIG. 1 taken along a widthwise direction.

As shown in FIG. 1, the case body 2 accommodates a connector assembly 20 that functions to electrically connect the motor 10 and an external connector (not shown), which is fitted into a socket 2e formed in the case body 2 and cover. The connector assembly 20 also functions to detect the rotation of the output gear 13. As shown in FIGS. 2 to 4, the connector assembly 20 includes a power supplying unit 20a, a connector unit 20b, and a sensor unit 20c.

The power supplying unit 20a includes a resin mold 21, which is arranged near the second end 10b of the motor 10 in the connector assembly 20. The resin mold 21 is elongated in a forward direction Y of the case body 2. Further, the first and second power supplying terminals 22a and 22b, which are metal plates, are insert molded so that they are partially embedded in and formed integrally with the resin mold 21. The resin mold 21 includes a first holding portion 23a and a second holding portion 23b respectively located at the two ends of the resin mold 21 in the forward direction. In FIGS. 1 and 2, the first holding portion 23a is located at the upper end of the resin mold 21, and the second holding portion 23b is located at the lower end of the resin mold 21. The first holding portion 23a is longer than the second holding portion 23b in the direction in which the axis L extends, namely, the widthwise direction S. Thus, the first holding portion 23a is projected closer to the motor 10 than the second holding portion 23b.

The resin mold 21 has a width in the forward direction Y that is slightly greater than that of the motor 10. A positioning projection 21a projects downward toward the bottom wall 2a from the longitudinally middle part in the lower surface of the resin mold 21. The positioning projection 21a is fitted into a slit 2f, which extends along the widthwise direction X in the bottom wall 2a of the case body 2. The positioning projection 21a and the slit 2f determine the position of the resin mold 21 in the case body 2.

As shown in FIGS. 2 to 4, the first and second power supplying terminals 22a and 22b respectively include L-shaped portions 24a and 24b extending toward the resin mold 21 toward the motor 10. The L-shaped portion 24a of the first power supplying terminal 22a extends from the first holding portion 23a of the resin mold 21. The L-shaped portion 24b of the second power supplying terminal 22b extends from the second holding portion 23b of the resin mold 21. The L-shaped portions 24a and 24b are respectively pressed to contact the first and second power receiving terminals 14a and 14b of the motor 10. Further, the ends of the power supplying terminals 22a and 22b opposite to the L-shaped portions 24a and 24b define power supplying junctions 25a and 25b that are connectable to connector terminals 35a and 35b, respectively.

The power supplying junctions 25a and 25b are located sideward from the L-shaped portion 24a at the side opposite to the L-shaped portion 24b and extends from the first holding portion 23a in the widthwise direction X toward the motor 10 (rightward as viewed in FIGS. 1 to 3). Further, the power supplying junctions 25a and 25b are arranged next to each other with respect to the forward direction Y and located at the same position with respect to the vertical direction Z.

The sensor unit 20c is arranged in a rear surface of the output gear 13 as viewed in FIG. 1. The sensor unit 20c includes a sensor holder 31, which is tubular and has a closed bottom and which is formed from a resin material. The sensor holder 31 is accommodated in a recess (not shown) formed in the rear surface of the output gear 13.

Referring to FIG. 2, a generally ring-shaped sensor 32 is accommodated in a rotatable manner in the sensor holder 31. The sensor 32 has a central portion defining a press-fitting bore 32a including a generally D-shaped inner circumferential surface. A shaft (not shown) extending from the output gear 13 in an axial direction of the output gear 13 is press-fitted into the press-fitting bore 32a. This rotates the sensor 32 integrally with the output gear 13. The sensor 32 is of, for example, a potentiometer type including a variable resistor and detects the rotational angle of the output gear 13.

The sensor holder 31 includes a peripheral portion from which two extensions 33 extend outward in the radial direction at equal intervals in the circumferential direction. Each extension 33 includes a positioning recess 33a, which is U-shaped and hollowed toward the center of the sensor holder 31. The positioning recess 33a engages a projection (not shown) formed in the case body 2. This positions the sensor holder 31 on the case body 2.

The connector unit 20b includes a terminal holder 34, which is frame-shaped and extends from the sensor holder 31 in the widthwise direction X. The terminal holder 34 is formed integrally with the sensor holder 31. The terminal holder 34 holds the two connector terminals 35a and 35b and three sensor terminals 36, which are electrically connected to the sensor 32.

The connector terminals 35a and 35b and the sensor terminals 36 are insert molded and formed integrally with the terminal holder 34 or the sensor holder 31. The terminals 35a, 35b, and 36 each include a distal portion extending along the widthwise direction X from the terminal holder 34. Further, the terminals 35a, 35b, and 36 are arranged next to one another in the forward direction Y. As shown in FIG. 3, the parts of the terminals 35a, 35b, and 36 extending outward from the terminal holder 34 are cranked. The sensor terminals 36 include basal portions that are extended to the sensor holder 31 and electrically connected to the sensor 32.

Referring to FIG. 1, the connector terminals 35a and 35b include basal portions extending from the terminal holder 34 along the forward direction Y toward the motor 10 and then bent at a right angle to extend along the widthwise direction X toward the power supplying unit 20a. The basal portions of the connector terminals 35a and 35b respectively include connector junctions 37a and 37b joined with the power supplying terminals 22a and 22b. The connector junctions 37a and 37b are arranged next to each other in the forward direction Y.

The connector junctions 37a and 37b are respectively joined with the power supplying junctions 25a and 25b. More specifically, as shown in FIG. 3, the connector junctions 37a and 37b are overlapped with the power supplying junctions 25a and 25b in the vertical direction Z and welded in this state with the connector junctions 37a and 37b located at the upper side. Further, as shown in FIG. 2, the connector junctions 37a and 37b each have a width (dimension in the forward direction Y) that is greater than that of each of the power supplying junctions 25a and 25b.

In the power supplying unit 20a of the connector assembly 20, the L-shaped portions 24a and 24b have similar structures. More specifically, the L-shaped portions 24a and 24b respectively include first extensions 41a and 41b, which extend from the holding portions 23a and 23b along the widthwise direction X toward the motor 10. A positioning hole 26 (refer to FIG. 2) extends through the first extension 41b in the vertical direction Z. The first extensions 41a and 41b include distal portions, which are located at the side opposite to the side closer to the holding portions 23a and 23b. The distal portions of the first extensions 41a and 41b are bent upward away from the bottom wall 2a of the case body 2 at a generally right angle. Further, the L-shaped portions 24a and 24b respectively include second extensions 43a and 43b extending upward from the bent portions 42a and 42b. Thus, the L-shaped portions 24a and 24b are formed to be L-shaped by the first extensions 41a and 41b and the second extensions 43a and 43b. As shown in FIG. 3, the second extensions 43a and 43b include upper end portions defining contact portions 44a and 44b, which are V-shaped so as to project toward the motor 10 and away from the resin mold 21. The second extensions 43a and 43b are slightly inclined toward the location at which the motor 10 is coupled before being coupled to the motor 10.

In the power supplying terminals 22a and 22b, referring to FIG. 4, the first extensions 41a and 41b and the bent portions 42a and 42b are located at the same position in the vertical direction Z. The contact portions 44a and 44b are located at different positions in the vertical direction Z. In the present embodiment, the contact portion 44b of the second power supplying terminal 22b is lower than the contact portion 44a of the first power supplying terminal 22a and closer to the bottom wall. In this manner, the second extension 43a has a length R1 in the vertical direction Z, and the second extension 43b has a length R2 in the vertical direction Z with the length R1 being greater than the length R2.

Referring to FIGS. 1 and 2, extension lengths D1 and D2 of the first extensions 41a and 41b from the holding portions 23a and 23b (i.e., lengths of the first extensions 41a and 41b in the widthwise direction) differ between the power supplying terminals 22a and 22b. In the present embodiment, the extension length D1 of the first extension 41a is less than the extension length D2 of the first extension 41b. Further, in the present embodiment, the distal portions of the first extensions 41a and 41b are located at the same position in the widthwise direction X, and the first holding portion 23a is extended further toward the motor 10 than the second holding portion 23b. Thus, the extension length D1 is less than the extension length D2.

The contact portions 44a and 44b of the power supplying terminals 22a and 22b having such dimensions elastically contact the first and second power receiving terminals 14a and 14b, respectively. Thus, the contact portions 44a and 44b respectively apply force to the power receiving terminals 14a and 14b. Further, the extension length D1 of the first holding portion 41a (i.e., the extension amount of the first holding portion 23a toward the motor 10) is set so that equal elastic forces are applied to the motor 10 from the L-shaped portions 24a and 24b of the power supplying terminals 22a and 22b.

In the actuator 1, the motor 10 is coupled to the case body 2 after the connector assembly 20 is coupled to the case body 2. Here, equal elastic forces are applied by the L-shaped portions 24a and 24b to the power supplying terminals 22a and 22b. Thus, the motor 10 can easily be coupled to the case body 2. Further, in the present embodiment, the bent portions 42a and 42b are location at the same position in the vertical direction Z. This allows the first and second power supplying terminals 22a and 22b to be formed from the same plate and improves yield.

Referring to FIG. 3, a reaction force of the elastic force applied by the L-shaped portions 24a and 24b to the motor 10 generates rotational force at the power supplying junctions 25a and 25b in the upward direction (refer to arrow in FIG. 3) at junctions of the power supplying terminals 22a and 22b and the connector terminals 35a and 35b. The connector junctions 37a and 37b are located at the upper side of the power supplying junctions 25a and 25b, that is, at the side that receives the rotational force of the power supplying junctions 25a and 25b. This prevents the power supplying junctions 25a and 25b from being separated from the connector junctions 37a and 37b of the connector terminals 35a and 35b by the rotational force. Further, in the present embodiment, the connector junctions 37a and 37b of the connector terminals 35a and 35b are wider than the power supplying junctions 25a and 25b. Thus, the connector junctions 37a and 37b receive the rotational force of the power supplying junctions 25a and 25b in a further preferable manner.

The present embodiment has the advantages described below.

(1) In the present embodiment, the actuator includes the motor 10 and the case. The motor 10 includes the first end, from which the output shaft projects and the opposite second end 10b. The two power receiving terminals 14a and 14b are arranged on the second end 10b. The case accommodates the motor 10, the resin mold 21, the two connector terminals 35a and 35b, and the two power supplying terminals 22a and 22b. The motor 10 is arranged so that the axis L of the motor 10 is perpendicular to the vertical direction of the case. The resin mold 21 is arranged in the case at a location close to the second end 10b. The connector terminals 35a and 35b are connectable to an external connector. The power supplying terminals 22a and 22b include portions embedded in the resin mold 21 and are electrically connected to the connector terminals 35a and 35b, respectively. The two power supplying terminals 22a and 22b respectively include the first extensions 41a and 41b and the second extensions 43a and 43b. The first extensions 41a and 41b extend from the resin mold 21 toward the motor 10 and includes distal portions defining the bent portions 42a and 42b, respectively. The second extensions 43a and 43b extend upward or downward from the bent portions 42a and 42b, respectively. The second extensions 43a and 43b include the contact portions 44a and 44b, which resiliently contact the corresponding power receiving terminals in the direction in which the axis L extends. The contact portions 44a and 44b are located at positions in the vertical direction that differ between the two power supplying terminals 22a and 22b. In the two power supplying terminals 22a and 22b, the bent portions 42a and 42b are located at the same position in the vertical direction. This allows the two power supplying terminals 22a and 22b to be formed from the same plate. Further, the extension length D1 of the first extension 41a from the resin mold 21 differs from the extension length D2 of the first extension 41b from the resin mold 21. Thus, the elastic force applied by each of the power supplying terminals 22a and 22b to the motor 10 can be adjusted to be equal. In this manner, the two power supplying terminals 22a and 22b can be formed from the same plate thereby improving yield, equal elastic force can be applied from the power supplying terminals 22a and 22b to the motor 10, and the coupling of the motor 10 is facilitated.

(2) In the present embodiment, the two power receiving terminals 14a and 14b are arranged at the same position in the direction in which the axis L extends. The basal ends of the first extensions 41a and 41b are arranged at different positions in the direction in which the axis L extends. Thus, in the structure in which the power receiving terminals 14a and 14b are arranged at the same position in the direction in which the axis of the motor 10 extends, the extension lengths D1 and D2 of the first extensions 41a and 41b from the resin mold 21 can differ between the power supplying terminals 22a and 22d.

(3) In the present embodiment, the first holding portion 23a of the resin mold 21 is longer than the second holding portion 23b in the direction in which the axis L extends. The two power supplying terminals 22a and 22b includes the power supplying junctions 25a and 25b, which are joined with the connector terminals 35a and 35b and extended from the resin mold 21 near the first holding portion 23a. The first holding portion 23a is longer than the second holding portion 23b in the direction in which the axis L extends. This stably holds the power supplying terminals 22a and 22b and prevents joining failures of the power supplying terminals 22a and 22b with the connector terminals 35a and 35b.

(4) In the present embodiment, the two connector terminals 35a and 35b include the connector junctions 37a and 37b, which are welded to the power supplying junctions 25a and 25b. With respect to the direction in which rotational force is applied to the power supplying terminals 22a and 22b, the connector junctions 37a and 37b are arranged at the front side (upper side in the present embodiment) of the power supplying junctions 25a and 25b. Thus, the connector junctions 37a and 37b receive the reaction forces of the elastic forces from the power supplying terminals 22a and 22b. As a result, the reaction force prevents the power supplying junctions 25a and 25b from separating from the connector junctions 37a and 37b. This prevents welding failures between the power supplying terminals 22a and 22b and the connector terminals 35a and 35b.

(5) In the present embodiment, the connector junctions 37a and 37b are wider than the power supplying junctions 25a and 25b. Thus, the connector junctions 37a and 37b can receive the reaction forces of the elastic forces from the power supplying terminals 22a and 22b in a further preferable manner. As a result, welding failures between the power supplying terminals 22a and 22b and the connector terminals 35a and 35b can be prevented in a further effective manner.

It should be apparent to those skilled in the art that the present invention may be embodied in many other specific forms without departing from the spirit or scope of the invention. Particularly, it should be understood that the present invention may be embodied in the following forms.

Figure 6:
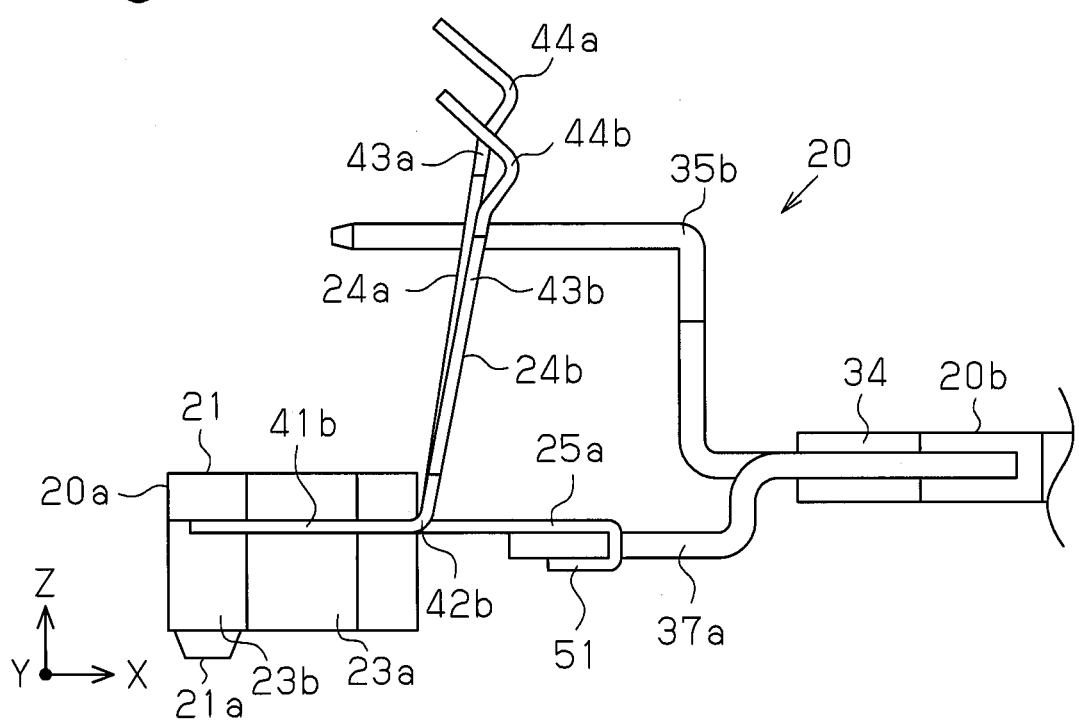
FIG. 6 is a side view showing another example of a connector assembly taken from the power supplying side along the forward direction.

In the above embodiment, the power supplying terminals 22a and 22b are joined with the connector terminals 35a and 35b through only welding. However, as shown in FIG. 6, instead of welding, the power supplying terminals 22a and 22b may be mechanically joined with the power supplying junctions 25a and 25b by a fitting portion 51.

In the above embodiment, the power supplying junctions 25a and 25b of the power supplying terminals 22a and 22b are arranged closer to the sensor unit 20c than the L-shaped portions 24a and 24b. However, the power supplying junctions 25a and 25b may be arranged on the opposite side of the sensor unit 20c with respect to the L-shaped portions 24a and 24b. In such a case, the reaction force of the elastic forces from the L-shaped portions 24a and 24b generate a downward rotational force at the power supplying junctions 25a and 25b. It is thus desirable that the connector junctions 37a and 37b be arranged at a lower side of the power supplying junctions 25a and 25b.

In the above embodiment, the second extensions 43a and 43b extend upward from the bent portions 42a and 42b. However, the second extensions 43a and 43b may extend downward from the bent portions 42a and 42b.

In the above embodiment, the resin mold 21 and the terminal holder 34 may be connected along the junctions 25a, 25b, 37a, and 37b.

The present examples and embodiments are to be considered as illustrative and not restrictive, and the invention is not to be limited to the details given herein, but may be modified within the scope and equivalence of the appended claims.

The invention claimed is:

1. An actuator comprising:
    a motor including a first end, an opposite second end, and two power receiving terminals arranged on the second end, wherein an output shaft projects from the first end;
    a case that accommodates the motor so that an axis of the motor extends perpendicular to a vertical direction of the case;
    a resin mold arranged in the case at a location close to the second end;
    two connector terminals that are connectable to an external connector;
    two power supplying terminals electrically connected to the two connector terminals, respectively, wherein each of the power supplying terminals is partially embedded in the resin mold and includes a first extension and a second extension, the first extension extends from the resin mold toward the motor and includes a distal portion defining a bent portion, the second extension extends upward or downward from the bent portion and includes a contact portion that elastically contacts a corresponding one of the power receiving terminals in a direction in which the axis extends, and the contact portion of one of the two power supplying terminals is located at a position in the vertical direction that differs from the contact portion of the other one of the two power supplying terminals;
    wherein the bent portions in the two power supplying terminals are arranged at the same position in the vertical direction, and the first extensions are extended by different extension lengths from the resin mold.

2. The actuator according to claim 1, wherein
    the two power receiving terminals are arranged at the same position in the direction in which the axis extends,
    the two first extensions each include a basal end, and
    the basal ends of the two first extensions are located at different positions in the direction in which the axis extends.

3. The actuator according to claim 2, wherein the resin mold includes a first holding portion, which holds the one of the two power supplying terminals having the first extension with the smaller extension length, and a second holding portion, which holds the other one of the two power supplying terminals, and
    the first holding portion is longer than the second holding portion in the direction in which the axis extends.

4. The actuator according to claim 3, wherein the two power supplying terminals respectively include power supplying junctions extended from the resin mold near the first holding portion and joined with the connector terminals.

5. The actuator according to claim 1, wherein
the power supplying terminals receive rotational force in a specific direction when a reaction force of the pressing force from the power supplying terminals to the motor is applied to the power supplying terminals,
the two power supplying terminals respectively include power supplying junctions extended from the resin mold and welded to the connector terminals, and
each of the two connector terminals respectively include connector junctions welded to the power supplying junctions, and
the connector junctions are located at a front side of the power supplying junctions with respect to a direction in which the rotational force is applied to the power supplying terminals.

6. The actuator according to claim 5, wherein the connector junctions are wider than the power supplying junctions.

* * * * *